United States Patent [19]

Shuert

[11] Patent Number: 5,555,820
[45] Date of Patent: Sep. 17, 1996

[54] PALLET WITH PLASTIC LEGS

[76] Inventor: Lyle H. Shuert, 1034 Stratford Pl., Bloomfield Hills, Mich. 48303

[21] Appl. No.: 426,876

[22] Filed: Apr. 24, 1995

Related U.S. Application Data

[63] Continuation-in-part of Ser. No. 166,730, Mar. 1, 1988, Pat. No. 5,470,641, which is a continuation-in-part of Ser. No. 993,762, Dec. 18, 1992, Pat. No. 5,401,347.

[51] Int. Cl.$^6$ .................................................. B65D 19/00
[52] U.S. Cl. ........................................ 108/51.1; 108/901
[58] Field of Search .................................... 108/901, 902, 108/51.1, 56.1

[56] References Cited

U.S. PATENT DOCUMENTS

| | | |
|---|---|---|
| 2,486,284 | 10/1949 | Horwitz . |
| 3,467,032 | 9/1969 | Rowlands et al. . |
| 3,604,368 | 9/1971 | Baxter . |
| 3,610,173 | 10/1971 | Mellwraith et al. . |
| 3,664,271 | 5/1972 | Wolder et al. . |
| 3,667,403 | 6/1972 | Angelbeck, Jr. . |
| 3,680,496 | 8/1972 | Westlake, Jr. . |
| 3,691,964 | 9/1972 | Larson et al. . |
| 3,697,029 | 10/1972 | Lauffer . |
| 3,699,902 | 10/1972 | Allgeyer et al. . |
| 3,824,933 | 7/1974 | Lind ................................. 108/902 X |
| 3,835,792 | 9/1974 | Wharton ........................... 108/902 X |
| 3,868,915 | 3/1975 | Hafner ............................. 108/901 X |
| 5,117,762 | 7/1992 | Shuert . |
| 5,255,613 | 10/1993 | Shuert . |

FOREIGN PATENT DOCUMENTS 0226505  6/1987  European Pat. Off. .

*Primary Examiner*—Jose V. Chen
*Attorney, Agent, or Firm*—Young & Basile, P.C.

[57] ABSTRACT

A plastic pallet having an upper platform and a plurality of plastic legs attached to and extending downward from the underside thereof. The plastic legs comprise upper and lower molded plastic sheets. The upper sheet comprises a generally planar top panel and a skirt extending downwardly from the periphery thereof and having a distal edge defining an annular bonding surface. The top panel further has a hollow conical boss extending downwardly therefrom and including an annular sidewall portion and a bottom wall portion at the lower end thereof. The lower sheet is identical to the upper sheet but is rotated to an inverted position such that a skirt and hollow boss extend upwardly from a lower panel, the distal edge of the skirt defining an annular bonding surface and the hollow boss having an annular side wall portion and a top wall portion at the upper end thereof. When the upper and lower sheets are brought together, the bonding surfaces of the upper and lower sheet skirt edges are placed in registry with one another and fused together, the bottom wall portion of the top panel boss is fused to the upper surface of the bottom panel, the top wall portion of the bottom panel boss is fused to the lower surface of the top panel, and the side wall portions of the top and bottom panel bosses are fused together along an angled interface therebetween.

22 Claims, 4 Drawing Sheets

PALLET WITH PLASTIC LEGS

RELATED APPLICATION

This is a continuation-in-part of U.S. patent application Ser. No. 08/166,730 filed on Mar. 1, 1988 now U.S. Pat. No. 5,470,641 which is a continuation-in-part of U.S. patent application Ser. No. 07/993,762 filed on Dec. 18, 1992, and issued as U.S. Pat. No. 5,401,347 on Mar. 28, 1995.

BACKGROUND OF THE INVENTION

This invention relates to pallets used to package, store, and handle materials and more specifically to such pallets having plastic legs according to the invention.

Pallets have traditionally been formed of wood. Wood pallets, however, have many disadvantages. For example, they are subject to breakage and thus are not reusable over extended periods of time. Wood pallets, as they will deteriorate if left exposed to the elements, must be stored indoors when not in use and so take up a considerable amount of valuable floor space in the warehouse. In an effort to solve some of the problems associated with wood pallets, plastic pallets have been developed and employed with some degree of success.

In one generally successful form of plastic pallet design, an upper panel or platform is formed by fusing together upper and lower plastic sheets to form a reinforced double wall or "twin sheet" structure.

Some pallets consist of a single upper panel constituting a load-bearing platform with a plurality of legs extending downward from the platform to maintain it in spaced relation to a support surface on which the legs rest. Other pallets consist of two panels, the first constituting an upper platform structure and the second a lower base structure, with a plurality of legs or spacers separating the two. In both of the foregoing types of pallets, referred to as single faced and double faced pallets respectively, the legs are distributed over the undersurface of the platform structure in a number and density sufficient to adequately support the weight likely to be carried by a particular pallet design when used in its intended manner. For example, for a rectangular pallet, there will typically be nine legs with one located at each corner of the pallet, one midway along each of the pallet sides, and one at the center of the pallet.

The legs are typically formed by molding at each location where a leg is desired a large downwardly extending protrusion in both the upper and lower plastic sheets of the twin sheet structure. The leg protrusion of the top sheet fits inside of and is fused to that of the lower sheet, and the resulting leg extends downwardly substantially below the lower surface of the platform structure.

A disadvantage of this construction is that the pallet must be fabricated on a mold that can only produce a pallet having one predetermined configuration of legs. Thus, the production of a range of different pallets optimized for specific applications and having different numbers and patterns of legs requires the pallet fabricator to invest in a large number of different molds. Further, the leg structures are of necessity formed of the same thickness plastic material as the platform structure so that the structural requirements and concerns of the leg structures may not be individually addressed but, rather, must be address in consideration of the often divergent structural requirements and concerns of the platform structure.

SUMMARY OF THE INVENTION

This invention is directed to the provision of an improved pallet structure that is lightweight, strong, durable and maintenance free, relatively inexpensive, and provides all-weather performance.

This invention is further directed to the provision of an improved pallet structure that is of modular construction wherein pallet platforms and leg units, each of a standard design, are formed separately and may be assembled to form pallets of a wide variety of configurations.

The plastic pallet of the invention comprises a platform structure having a generally planar underface and a plurality of individual legs extending downwardly from the underface in spaced relation. Each leg comprises a modular plastic structure of box configuration including a generally planar upper portion, a generally planar lower portion, and an annular portion interconnecting the upper and lower portions and maintaining the upper and lower portions in spaced relation. The legs are secured to the platform structure by fusing the upper portions of each leg to the underface of the platform structure with the legs in spaced relation. This modular construction allows the structural requirements of the legs to be individually addressed so as to facilitate the provision of an extremely strong and yet relatively inexpensive pallet structure.

According to a further feature of the invention, the annular portion of each leg comprises an outer skirt portion and each leg further includes a column structure positioned within the skirt portion and interconnecting the upper and lower planar portions. This arrangement provides an extremely strong leg structure and further provides a leg structure that will survive even total decimation of the outer skirt portion of the leg by a forklift truck or the like.

According to a further feature of the invention, each leg is formed of first and second sheets of plastic material fused together to provide the box configuration. This specific construction allows the legs to be quickly and inexpensively manufactured.

According to a further feature of the invention, the first plastic sheet is molded to define a first planar body main portion and a first annular skirt portion extending therefrom to define a first annular surface, and the second plastic sheet defines a second planar main body portion and a second annular surface corresponding in size and configuration to the first annular surface. The first and second sheets are fused together at their respective annular surfaces to form a hollow box-like leg having first and second main body portions spaced apart by the annular skirt portion. The resulting leg is secured to the platform structure by fusing one of the main body portions to the underside of the platform structure. The pallet thus formed has legs that may be economically produced by a vacuum forming process separately from the platform and thereafter fused to the platform in the number, the configuration and the spacing required to give the pallet sufficient strength for a particular pallet application.

According to a further feature of the invention, the first plastic sheet comprises an upper sheet with the first annular skirt portion extending downwardly from the first main body portion such that the first annular surface faces downwardly, and the second plastic sheet comprises a lower sheet and further includes a second annular skirt extending upwardly from the second main body portion such that the second annular surface is defined by an upwardly facing upper annular edge of the second skirt portion. This construction allows the upper and lower sheets to be formed as two identical pieces, with attendant benefits in manufacturing economy.

According to a further feature of the invention, the pallet further includes a generally planar base structure, an upper surface of which is fused to the main body portion of the lower sheet of the leg so that the leg, in coaction with other legs, separates the platform structure and base structure to define passageways therebetween for the entry of material handling equipment. The pallet thus produced is of the double faced type in which the base structure, rather than the legs themselves, contacts any supporting surface on which the pallet rests.

According to yet another feature of the invention pallet, a leg comprises an upper plastic sheet having an upper face secured to the underside of the pallet platform panel and a hollow upper boss which opens in the upper face and extends downwardly therefrom, and a lower plastic sheet having a hollow lower boss which opens in a lower face of the lower sheet and extends upwardly therefrom. The upper and lower bosses contact one another and are fused together to connect the upper and lower sheets. The leg formed in this manner is well suited to a vacuum molding production process, and the coacting bosses give the leg significant strength.

According to a further feature of the invention, the upper boss includes an annular side wall and a bottom wall, and the lower boss includes an annular side wall, with the side walls being of generally equal height. In connecting the upper and lower sheets, the side walls of the upper and lower bosses are fused together, the bottom wall of the upper boss is fused to an upper surface of the lower sheet, and the top wall of the lower boss is fused to a lower surface of the upper sheet. By fusing the upper and lower sheets together in this manner, the bosses coact to provide a central column structure which contributes greatly to the overall crush-resistance of the leg structure.

According to yet another feature of the invention, the upper sheet further includes an upper annular downwardly extending skirt in surrounding relation to the upper boss and the lower sheet further includes a lower annular upwardly extending skirt in surrounding relation to the lower boss, with a lower annular edge of the upper skirt fused to an upper annular edge of the lower skirt. This arrangement creates a box-like leg structure with the annular skirts and bosses connecting the upper and lower faces of the leg and thereby providing the leg with superior rigidity and crush resistance.

According to a further feature of the invention, the side walls of the upper and lower bosses taper in a complementary fashion to define an angled interface therebetween and the side walls are fused together at this angled interface. The tapered configuration of the boss side walls provides improvement in both manufacturability of the legs and in the strength thereof.

According to still another feature of the invention, the side walls of the upper and lower bosses have grooves running along the length of the angled interface such that when the side walls are fused together, the grooves are aligned to form a hollow stiffening column which runs between the upper and lower surfaces of the leg along the angled interface at the epicenter of the leg structure. This stiffening column provides a further significant increase in the crush resistance of the leg with only a small increase in the amount of plastic material required to manufacture the leg.

In a preferred embodiment of the invention plastic pallet, the pallet comprises a platform structure and a base structure, both of which are of twin sheet construction. The legs, formed in accordance with the invention, are fused to the underside of the platform structure and to the upper side of the base structure in a density and pattern sufficient to provide the pallet with the level of strength necessary for its intended usage. The legs are preferably spaced from one another to define passageways therebetween for the receipt of material handling equipment, such as a forklift.

DETAILED DESCRIPTION OF THE PREFERRED EMBODIMENTS

Figure 1:
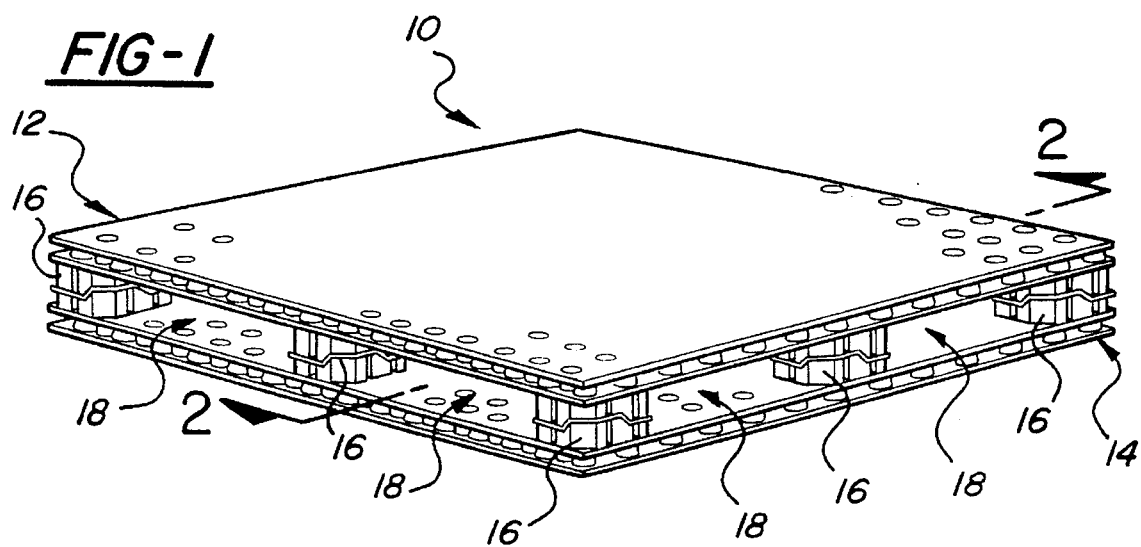
FIG. 1 is a perspective view of a double faced pallet according to the invention.

As seen in FIG. 1, the pallet 10 of the present invention is comprised essentially of an upper platform structure 12, a lower base structure 14, and legs 16 located between and secured firmly to platform structure 12 and base structure 14. Pallet 10 may be of any desired shape and size with any desired number of legs 16. A representative pallet as used in industry is rectangular and includes nine legs, one leg positioned at each corner of pallet 10, one midway along each of the four sides, and one in the center of pallet 10. Legs 16 are spaced from one another to define forklift entry passages 18 passing through pallet 10. Passages 18 are accessible from all four sides of pallet 10, and are of sufficient size to receive the tines of a forklift (not shown) or a similar material handling device for lifting and moving pallet 10.

Figure 1A:
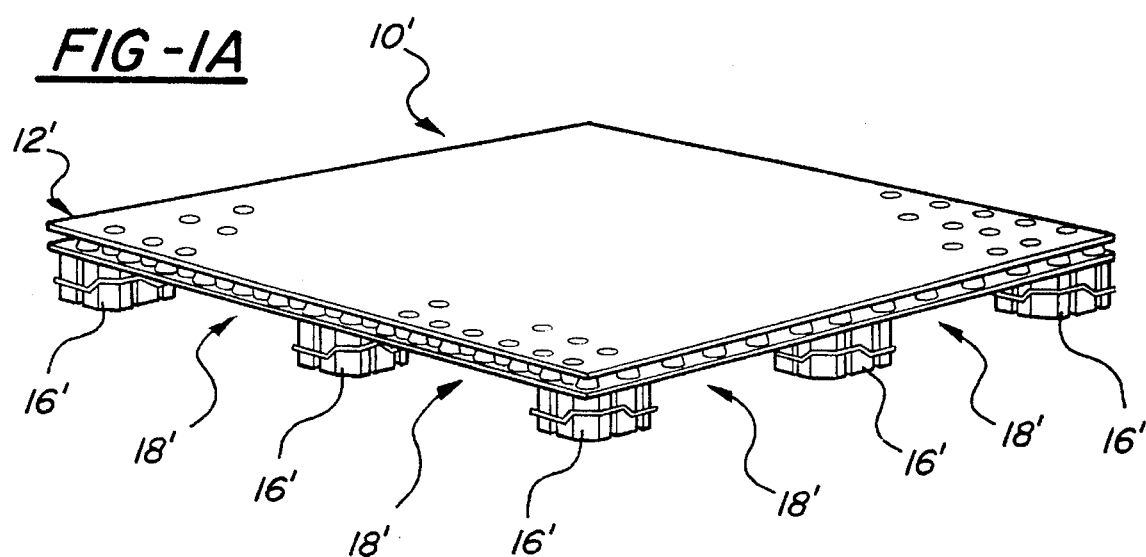
FIG. 1A is a perspective view of a single faced pallet according to the invention.
Figure 2:
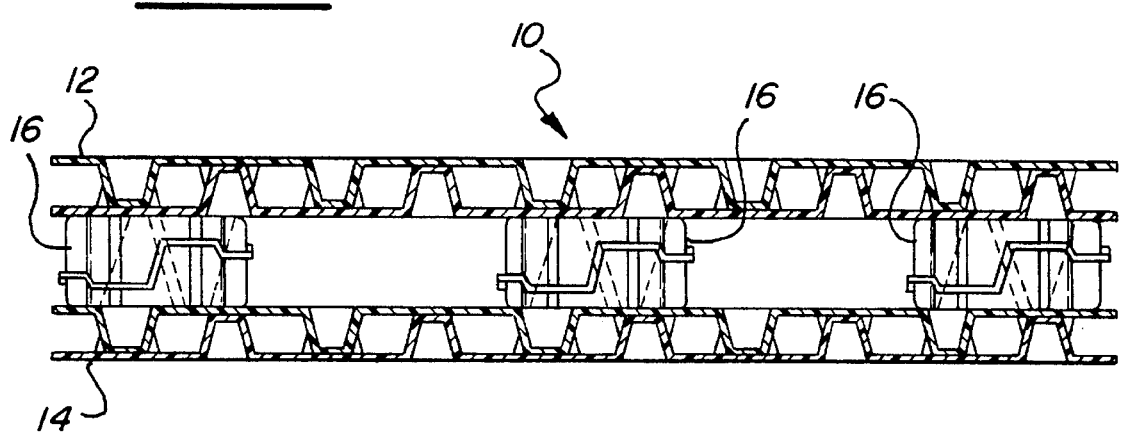
FIG. 2 is a side view of the pallet of FIG. 1.
Figure 3:
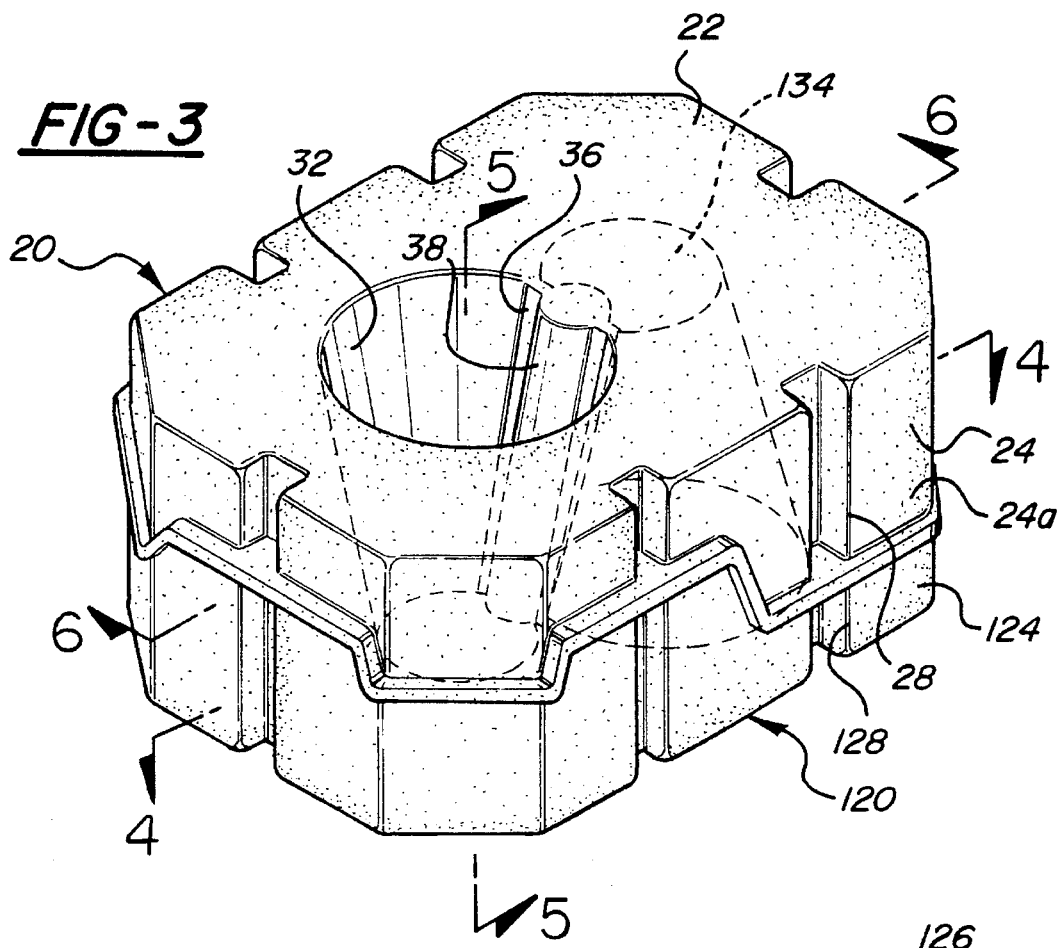
FIG. 3 is a perspective view of a leg used in the invention pallet.
Figure 4:
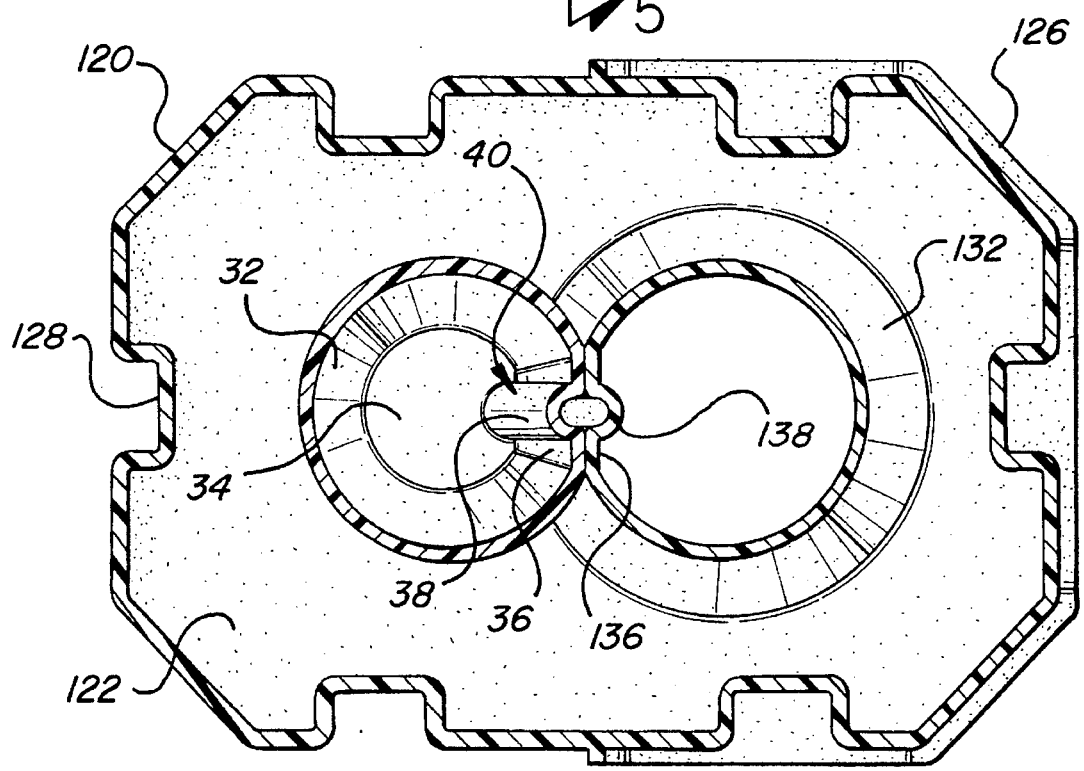
FIG. 4 is a cross-sectional view taken on line 4—4 of FIG. 3.
Figure 5:
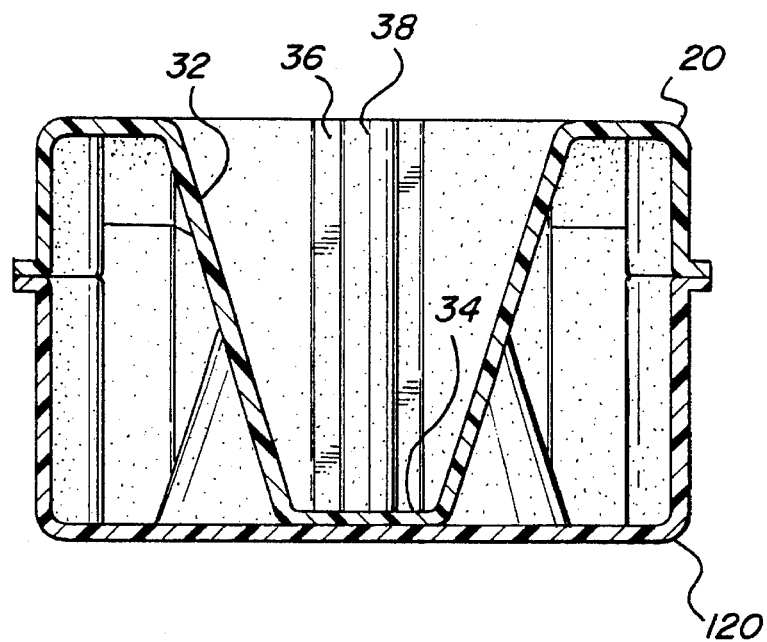
FIG. 5 is a cross-sectional view taken on line 5—5 of FIG. 3.
Figure 6:
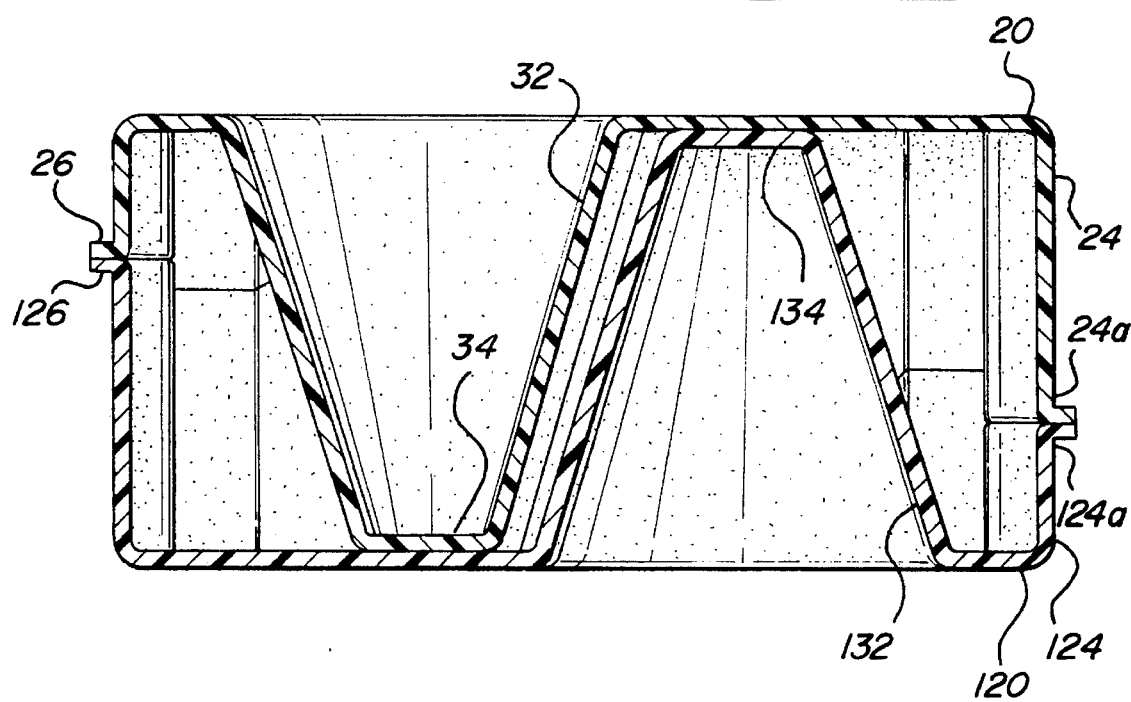
FIG. 6 is a cross-sectional view taken on line 6—6 of FIG. 3.

An alternative embodiment of the pallet of the present invention is depicted in FIG. 1A and is identical to the above-described embodiment in all respects except that pallet 10' is of the single faced type and as such does not include a base structure. Legs 16' are fixed to the bottom of platform structure 12' and rest directly upon a supporting surface. Note that, as in the first described embodiment, the spaces between legs 16' define forklift entry passages 18' accessible from all four sides of pallet 10'.

As depicted in FIGS. 3–7, each leg 16 is formed from an upper plastic sheet 20 and a lower plastic sheet 120 which are bonded together to form a box-like structure. Sheets 20, 120 are formed in coaction with vacuum forming molds (not shown) as described in U.S. Pat. No. 5,401,347, the disclosure of which is incorporated herein by reference. The forming process involves heating sheets 20, 120, which as raw stock are flat, and using vacuum pressure to bring each sheet into conformance with respective molds. While sheets 20, 120 are still in a heated flowable state the molds are brought together to place sheets 20, 120 in contact and fuse them together along selected surfaces.

It should be noted that in the preferred embodiment of leg 16 described and depicted herein, upper sheet 20 and lower sheet 120 are identically molded pieces, and as such the distinction between sheets 20 and 120 being upper and lower respectively is purely arbitrary and used herein for descriptive purposes only. To emphasize this fact, the reference numerals assigned to the components making up lower sheet 120 differ from those assigned to the components of upper sheet 20 only in their leading digit. It should also be noted that, unless otherwise stated, any description of a feature of upper sheet 20 applies also to the corresponding feature of lower sheet 120.

Figure 7A:
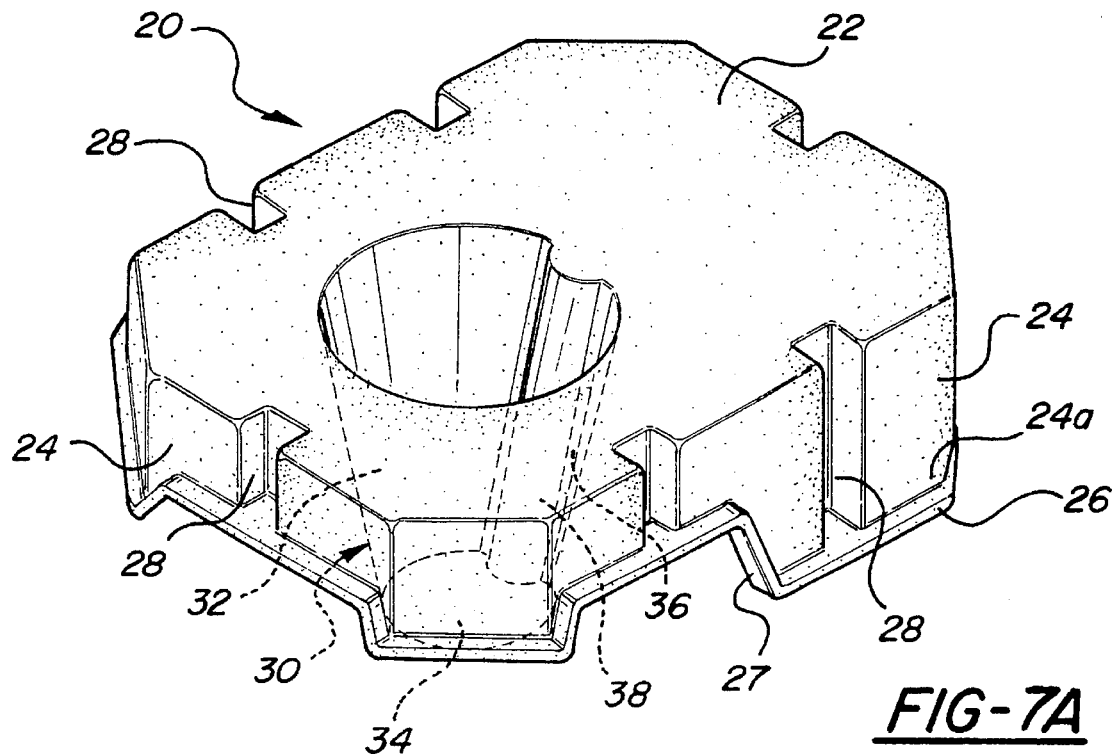
FIGS. 7A and 7B are perspective views of upper and lower halves, respectively, utilized in constructing the pallet leg.

As best seen in FIG. 7A, upper sheet 20 includes a generally planar top panel 22 and a skirt 24 extending downwardly from the periphery thereof. The vertical dimension of skirt 24 varies around the periphery so that the lower, distal edge 24A of skirt 24 has a stepped or notched configuration. The distal edge 24A is flared outward to form a flange 26, the bottom of which defines an annular bonding surface 27 running around the entire periphery of skirt 24.

To add greater stiffness to the resulting leg structure, skirt 24 is formed with a plurality of vertically extending channels 28 which project inward from the outer surface of the skirt 24.

A hollow boss 30 extends downwardly from top panel 22 and is generally frustoconcical in shape, having an annular side wall 32 and a substantially planar bottom wall 34. Boss 30 is offset toward one end of upper sheet 20 and a flat 36 is formed on the side of boss 30 facing toward the end of upper sheet 20 opposite the direction of the offset. Flat 36 runs straight down the frustrum of boss 30, and a groove 38 passes along the center line of flat 36, projecting toward the inner or concave side of boss 30.

As noted, lower sheet 120 is identical to upper sheet 20 but is oriented in an inverted position so that skirt 124 extends upwardly from the periphery of a planar bottom panel 122 and flares outward at distal edge 124A to form a flange 126, the bottom of which defines an annular bonding surface 127, and boss 130 extends upwardly from bottom panel 122 in staggered, meshing relation to downwardly extending boss 30.

Figure 7B:
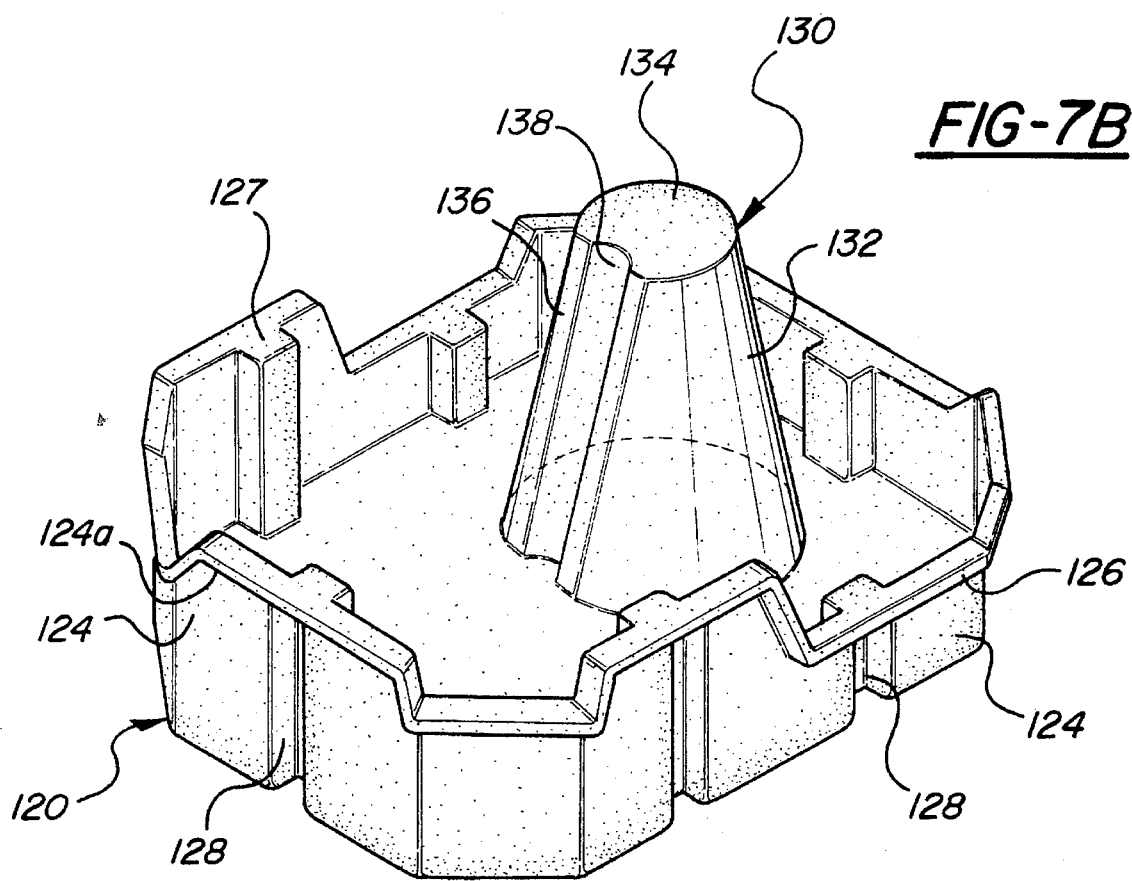

In the final step of the leg forming process described above, upper sheet 20 and lower sheet 120 are aligned in the mutually opposed relationship depicted in FIGS. 7A and 7B and brought together so that the notched lower and upper edges of skirts 24, 124 fit together in a meshing relationship, with bonding surfaces 27, 127 in registry and fused to one another around substantially the entire circumference of flanges 26, 126. Bosses 30, 130 also fit meshingly together, with flats 36, 136 in planar contact with one another and fused together along the angled interface therebetween. When so mated, grooves 38, 138 are aligned with one another to define a hollow stiffening column 40, best seen in FIGS. 4 and 6, running along the angled interface.

Bosses 30, 130 are preferably of equal height, that height being equal to the combined height of skirts 24 and 124 so as to completely span the distance between top panel 22 and bottom panel 122. In this configuration, when upper and lower sheets 20, 120 are joined to fuse skirts 24, 124, bottom wall 34 of boss 30 is placed in contact with and fused to the upper surface of bottom panel 122 and the top wall 134 of boss 130 is likewise placed in contact with and fused to the lower surface of top panel 22.

The plastic leg 16 thus formed includes an upper face defined by the top panel 22 of upper sheet 20, a lower face defined by the bottom panel 122 of lower sheet 120, an annular skirt or shell defined by the fused together skirts 24, 124, a central pillar or column structure defined by the fused together bosses 30, 130 and coacting with the annular skirt to define an annular space therebetween, and a further stiffening column structure 40 at the epicenter of the leg.

To form a single faced pallet 10' utilizing the invention legs 16, the attachment surfaces formed by the upper faces of the top panels 22 are suitably fused to a plurality of downwardly facing attachment surfaces define on the lower surface of platform structure 12' at spaced locations as seen in FIG. 1A. To form a doubled faced pallet 10, the lower surfaces of the bottom panels 122 are suitably fused to an upper surface of platform structure 14 at spaced locations as seen in FIG. 1.

Whereas the particular plastic material utilized to form the invention pallet is not critical, it has been found that excellent results may be obtained by the use of a high density polyethylene having a density of approximately 0.950 grams per cubic centimeter.

The invention will be seen to provide a pallet structure that is lightweight, strong, durable and maintenance free, provides all-weather performance, is relatively inexpensive and allows pallet design flexibility. By producing a standard leg separately from the pallet platform and base panels, a modular design is achieved whereby pallets having different platform sizes and different numbers and patterns of legs may be produced using a minimum of production molds and fixtures. The modular design also allows the peculiar structural requirements of the legs to be individually addressed without concern for the structural requirements of the platform structure or the base structures so that, for example, a first thickness of plastic sheet material might be utilized for the platform structure and base structure and a second, totally different thickness of plastic material might be utilized for the legs. Further, the invention leg structure, with its outer skirt structure and separate inner central column structure, provides double protection for the leg so that even if the outer skirt structure is destroyed by a forklift truck or the like, the leg will still remain effective by virtue of the central column structure.

Whereas preferred embodiments of the invention have been illustrated and described in detail, it will be apparent that various changes may be made in the disclosed embodiments without departing from the scope or spirit of the invention. For example, although the bosses have been illustrated and described as having a circular cross-sectional configuration, other cross-sectional configurations such as, but not limited to, rectangular or oval configurations, may be employed. Similarly, although the skirts have been illustrated and described as having a flattened oval cross sectional configuration, other cross sectional configurations such as, but not limited to, rectangular or circular configurations may be employed. Accordingly, the term "annular" as used in the claims to describe the side walls of the skirts or the bosses will be understood to include any closed loop cross-sectional configuration.

I claim:

1. A plastic pallet comprising a generally planar plastic platform structure having an underface and a plurality of individual modular legs extending downwardly from the underface in spaced relation, characterized in that:

a plurality of spaced downwardly facing attachment surfaces are defined on the underface of the platform structure;

each leg comprises a modular plastic structure of closed box configuration including an upper portion defining an upwardly facing attachment surface, a lower portion positioned in underlying relation to the upper portion, and an annular portion interconnecting the upper and lower portions to complete the closed box leg configuration and maintaining the upper and lower portions in spaced relation; and the legs are secured to the platform structure by positioning the upwardly facing attachment surfaces of each leg adjacent a respective downwardly facing attachment surface on the underface of the platform structure and fusing the upper portion of each leg to the underface of the platform structure at the interface of the attachment surfaces to fixedly secure the legs in spaced relation to the underface of the platform structure.

2. A plastic pallet according to claim 1 wherein:

the annular portion of each leg comprises an outer skirt portion; and each leg further includes a central column positioned within the outer skirt portion and interconnecting the upper and lower portions.

3. A plastic pallet according to claim 1 wherein:

each leg is formed of first and second sheets of plastic material fused together to provide the box configuration.

4. A plastic pallet comprising a generally planar plastic platform structure having an underface and a plurality of individual modular legs extending downwardly from the underface in spaced relation, characterized in that:

a plurality of spaced downwardly facing attachment surfaces are defined on the underface of the platform structure;

each leg comprises a modular plastic structure including a top panel, a bottom panel, an outer shell extending between and interconnecting the top and bottom panels of the leg and an inner column structure extending between and interconnecting the top and bottom panels of the leg and coacting with the outer shell to define an annular space therebetween; and the legs are fused in spaced relation to the underface of the platform structure by fusing the top panel of each leg to an attachment surface on the underface of the platform structure.

5. A plastic pallet according to claim 4 wherein:

each leg is formed of two sheets of molded plastic fused together to define a box structure.

6. A plastic pallet according to claim 5 wherein:

the two sheets of each leg comprise an upper sheet and a lower sheet;

the upper sheet of each leg includes a planar portion, defining the top panel of the leg, and a downwardly extending boss;

the lower sheet of each leg includes a planar portion, defining the bottom panel of the leg, and an upwardly extending boss; and the upwardly and downwardly extending bosses are fused together to form the inner column structure.

7. A plastic pallet according to claim 6 wherein:

the upper sheet further includes a downwardly extending skirt portion in surrounding relation to the top panel;

the lower sheet further includes an upwardly extending skirt portion in surrounding relation to the bottom panel;

the upwardly and downwardly extending skirt portions are fused together to form the shell.

8. A plastic pallet comprising a polygonal platform structure having a generally planar underface and a plurality of individual modular legs extending downwardly from the underface in spaced relation and including at least one individual leg proximate each corner of the platform structure, characterized in that:

a plurality of spaced downwardly facing attachment surfaces are defined on the underface of the platform structure including at least one attachment surface proximate each corner of the platform structure;

each leg comprises a first molded plastic sheet defining a first planar main body portion and a first annular skirt portion extending from the main body portion to define a first annular surface and a second plastic sheet defining a second planar main body portion and a second annular surface corresponding in size and configuration to the first annular surface;

the first and second sheets are fused together at their respective annular surfaces to form a hollow leg of closed box configuration having first and second main body portions spaced apart by the annular skirt portion; and the leg is secured to the platform structure by fusing one of the main body portions to a respective attachment surface on the underface of the platform structure.

9. A pallet according to claim 8 wherein:

the first plastic sheet comprises an upper sheet, the first annular skirt portion extends downwardly from the first main body portion, the first annular surface comprises a downwardly facing annular surface, the second plastic sheet comprises a lower sheet and further includes a second annular skirt portion extending upwardly form the second main body portion, and the second annular surface faces upwardly and is defined by the upper annular edge of the second skirt portion.

10. A pallet according to claim 8 wherein:

the pallet further includes a generally planar base structure; and the other main body portion of the leg is fused to an upper surface of the base structure so that the leg, in coaction with other legs, separates the platform structure and base structure to define passageways therebetween for the entry of material handling equipment.

11. A pallet including:

a generally planar plastic platform structure; and a modular plastic pallet leg including an upper plastic sheet including a generally planar main body portion having an upper surface secured to an underface of the platform structure and an upper boss opening in the upper surface and including an annular side wall extending downwardly from the main body portion, and a lower plastic sheet including a generally planar main body portion and a lower boss opening in a lower surface of the main body portion of the lower sheet and including an annular side wall portion extending upwardly from the main body portion and fused to the downward extending side wall of the upper boss.

12. A pallet according to claim 11 wherein:

the pallet further includes a generally planar plastic base structure and the main body portion of the lower surface of the lower sheet is secured to an upper face of the base structure by fusion.

13. A pallet according to claim 11 wherein:

the upper boss includes an annular side wall and a bottom wall;

the lower boss includes an annular side wall having a height generally corresponding to the height of the annular side wall of the upper boss and a top wall; and the side wall of the upper boss is fused to the side wall of the lower boss, the bottom wall of the upper boss is fused to an upper surface of the lower sheet, and the top wall of the lower boss is fused to a lower surface of the upper sheet.

14. A pallet according to claim 13 wherein:

the upper sheet includes an upper annular downwardly extending skirt in surrounding relation to the upper boss;

the lower sheet includes a lower annular upwardly extending skirt in surrounding relation to the lower boss; and a lower annular edge of the upper skirt is fused to an upper annular edge of the lower skirt.

15. A pallet including a generally planar platform structure having upper and lower faces, and a plurality of plastic legs secured to the lower face of the platform structure in spaced relationship with one another and extending downwardly therefrom, each leg comprising:

a molded plastic upper sheet defining a generally planar top panel and a skirt extending downwardly from a periphery of the top panel, a distal edge of the skirt defining an annular bonding surface, the top panel having an upper surface secured to an underface of the platform structure and a hollow upper boss opening in the upper surface of the top panel and including an annular side wall portion extending downwardly from the upper surface of the top panel; and a molded plastic lower sheet defining a generally planar bottom panel and a skirt extending upwardly from a periphery of the bottom panel, a distal end of the skirt defining an annular bonding surface, the bottom panel having a lower surface and a hollow lower boss opening in the lower surface of the bottom panel and including an annular side wall portion extending upwardly from the lower surface of the bottom panel;

the bonding surface of the upper sheet skirt and the bonding surface of the lower sheet skirt being in registry with one another and being fused together and the side wall portions of the upper and lower bosses being in contact and fused together.

16. A pallet according to claim 15 wherein:

the annular side wall portion of the upper and lower bosses have substantially equal heights;

the upper boss includes a bottom wall portion at the lower end of the side wall portion fused to the upper surface of the bottom panel; and the lower boss includes a top wall portion at the upper end of the side wall portion fused to the lower surface of the top panel.

17. A pallet according to claim 16 wherein the side wall portions of the top and bottom panel bosses taper in complementary fashion so as to define an angled interface therebetween and the side wall portions are fused together at the angled interface.

18. A pallet according to claim 17 wherein the side wall portions of the top and bottom panel bosses each have a groove running along the angled interface and projecting toward a concave side of the boss such that when the side wall portions are fused together the groove in the top boss side wall portion cooperates with the groove in the bottom boss side wall portion to form a hollow stiffening column running along the angled interface between the top panel and the bottom panel.

19. A pallet according to claim 18 wherein the platform structure comprises:

an upper plastic panel sheet including a generally planar main body portion having upper and lower surfaces and a plurality of spaced hollow bosses opening in the upper surface of the main body portion and each including an annular side wall portion extending downwardly from the lower surface of the main body portion and a bottom wall portion at a lower end of the annular wall portion; and a lower plastic panel sheet including a generally planar main body portion having upper and lower surfaces and a plurality of spaced hollow bosses opening in the lower surface of the main body portion and each including an annular side wall portion extending upwardly from the upper surface of the main body portion and a top wall portion at an upper end of the annular wall portion;

wherein the bottom wall portions of the upper panel sheet bosses are fused to the upper surface of the lower panel sheet main body portion at locations between adjacent lower panel sheet bosses, the top wall portions of the lower panel sheet bosses are fused to the lower surface of the upper panel sheet main body portion at locations between adjacent upper panel sheet bosses and the annular side wall portions of at least some of the upper panel sheet bosses are fused to the annular side wall portions of at least some of the lower panel sheet bosses.

20. A pallet according to claim 19 wherein:

the pallet further includes a base structure secured to the lower ends of the legs;

the base structure has a construction corresponding to the construction of the platform structure so as to include upper and lower sheets respectively defining downwardly extending and upwardly extending intermeshing bosses with side wall portions of at least some of the upwardly extending bosses fused to side wall portions of some of the downwardly extending bosses.

21. A pallet according to claim 15 wherein the pallet further includes a base structure secured to the lower ends of the legs so that the legs, the platform structure, and the base structure coact to define passageways for the receipt of material handling equipment.

22. For use as a part of a plastic pallet including a generally planar platform structure having upper and lower surfaces, a plastic leg securable to the lower surface of the platform structure such that the leg extends downwardly therefrom, the leg comprising:

a molded plastic upper sheet defining a generally planar top panel and a skirt extending downwardly from a periphery of the top panel, a distal edge of the skirt defining an annular bonding surface, the top panel having an upper surface securable to an underface of the platform structure and a hollow upper boss opening in the upper surface of the top panel and including an annular side wall portion extending downwardly from the upper surface of the top panel and a bottom wall portion at a lower end of the side wall portion; and a molded plastic lower sheet defining a generally planar bottom panel and a skirt extending upwardly from a periphery of the bottom panel, a distal end of the skirt defining an annular bonding surface, the bottom panel having a lower surface and a hollow lower boss opening in the lower surface of the bottom panel and including an annular side wall portion extending upwardly from the lower surface of the bottom panel and a top wall portion at an upper end of the side wall portion;

the bonding surface of the upper sheet skirt edge and the bonding surface of the lower sheet skirt edge being in registry with one another and fused together, the bottom wall portion of the top panel boss being fused to the upper surface of the bottom panel, the top wall portion of the bottom panel boss being fused to the lower surface of the top panel, and the side wall portion of the top panel boss being fused to the side wall portion of the bottom panel boss.

* * * * *